United States Patent [19]

Tamari

[11] Patent Number: 5,496,631
[45] Date of Patent: Mar. 5, 1996

[54] PERPENDICULAR MAGNETIC FILM, MULTILAYERED FILM FOR PERPENDICULAR MAGNETIC FILM AND PROCESS FOR PRODUCING PERPENDICULAR MAGNETIC FILM

[75] Inventor: Kousaku Tamari, Hiroshima, Japan

[73] Assignee: Toda Kogyo Corporation, Hiroshima, Japan

[21] Appl. No.: 158,854

[22] Filed: Nov. 29, 1993

[30] Foreign Application Priority Data

Nov. 30, 1992 [JP] Japan ..................................... 4-345241

[51] Int. Cl.$^6$ ................................ B32B 5/16; G11B 5/66
[52] U.S. Cl. ...................... 428/332; 428/336; 428/694 T; 428/694 TM; 428/701; 428/702; 428/900; 148/306; 148/310; 148/311; 148/312; 148/313; 148/315; 420/8; 420/435; 420/440; 420/452
[58] Field of Search .................. 428/694 T, 694 TM, 428/332, 336, 701, 702, 900; 148/306, 310, 311, 312, 313, 315; 420/8, 435, 440, 452

[56] References Cited

U.S. PATENT DOCUMENTS

| 4,975,324 | 12/1990 | Torii et al. | 428/329 |
| 5,024,854 | 6/1991 | Nakamura et al. | 427/38 |

FOREIGN PATENT DOCUMENTS

| 0122030A1 | 10/1984 | European Pat. Off. . |
| 0265246 | 4/1988 | European Pat. Off. . |
| 0502699A1 | 9/1992 | European Pat. Off. . |
| 0564188A1 | 10/1993 | European Pat. Off. . |
| 0600697 | 6/1994 | European Pat. Off. . |
| 51-119999 | 10/1976 | Japan . |
| 62-267949 | 11/1987 | Japan . |
| 63-47359 | 2/1988 | Japan . |
| 3-17813 | 1/1991 | Japan . |
| 3-188604 | 8/1991 | Japan . |
| 4-105935 | 6/1992 | Japan . |

OTHER PUBLICATIONS

Chemical Abstracts, vol. 108, No. 10, Mar. 07, 1988 (Columbus, Ohio, USA), M. Langlet et al., "Deposition by a new assisted DVD technique of ferrites thin films for high density magnetic recording," p. 770, column 1, abstract No. 86 519j.

Chemical Abstracts, vol. 110, No. 10, Mar. 06, 1989 (Columbus, Ohio, USA) K. Tamura et al "Magneto–optical recording medium from amorphous alloy etc" p. 704, column 2, abstract No. 85 667k.

Chemical Abstracts, vol. 104, No. 16, Apr. 21, 1986 (Columbus, Ohio,) Shimanuki et al "Magnetic recording materials" p. 627, col. 2, abstract No. 139 396t.

Chemical Abstracts, vol. 107, No. 14, Oct. 5, 1987 (Columbus, Ohio) Bando et al "Manufacture of ferromagnetic films for magnetic recording" p. 673, col. 2 Abstract No. 125 706u.

Summarized English Translation of "Proceedings of the 13th Meeting of magnetic Society of Japan," p. 246.

*Primary Examiner*—Leszek Kiliman
*Attorney, Agent, or Firm*—Nixon & Vanderhye

[57] ABSTRACT

Disclosed herein is a perpendicular magnetic film comprising a spinel thin film which is formed on a substrate, which contains Fe as the main ingredient and further contains Co and Ni, and which has a coercive force of less than 3000 Oe, the plane (400) thereof being predominantly oriented in parallel with said substrate, the spacing of the plane (400) being not more than 2.082 Å, the molar ratio of Co to Fe being 0.005 to 0.32 and the molar ratio of Ni to Co being at least 0.6.

4 Claims, 5 Drawing Sheets

$2\theta$

PERPENDICULAR MAGNETIC FILM, MULTILAYERED FILM FOR PERPENDICULAR MAGNETIC FILM AND PROCESS FOR PRODUCING PERPENDICULAR MAGNETIC FILM

BACKGROUND OF THE INVENTION

The present invention relates to a perpendicular magnetic film. More particularly, the present invention relates to a perpendicular magnetic film which is composed of a spinel thin film containing Fe as the main ingredient and further containing Co and Ni, which has an excellent oxidation resistance, an excellent anticorrosivity, and an appropriate coercive force for preventing a magnetic saturation of a magnetic head which is widely used at present, particularly, a coercive force of less than 3000 Oe, and hence, which is suitable as a high-density magnetic recording medium. The present invention also relates to a process for producing such a perpendicular magnetic film, and a multilayered film for a perpendicular magnetic film which is used as an intermediate in the production of the perpendicular magnetic film.

With recent remarkable tendency for miniaturized and higher reliable information processing apparatuses and systems, magnetic recording media have increasingly been required to have a higher recording density. A perpendicular magnetic film as a magnetic recording medium which respond to such demand has been rapidly developed and put to practical use. Perpendicular magnetic films which are magnetized perpendicularly to the film surface are not only free from demagnetization but also capable of high-density recording.

An alloy film such as a CoCr alloy film has conventionally been proposed as a perpendicular magnetic film. However, it is necessary to coat the surface of a CoCr alloy film with a carbon film having a thickness of about 100 to 200 Å in order to prevent the deterioration of the magnetization characteristics. As a result, the spacing (the distance between a magnetic head and the recording medium) loss is increased by the distance corresponding to the thickness of the carbon film, which is unsuitable for high-density recording. For this reason, a material of a perpendicular magnetic film is strongly required to be an oxide which is stable against oxidation.

As to the coercive force of a perpendicular magnetic film, an appropriate coercive for preventing a magnetic saturation of a magnetic head which is widely used at present, particularly, a coercive force of less than 3000 Oe is required.

The coercive force (Hc) of a magnetic recording medium has a close relationship with the performance of a magnetic head, as is well known. When the coercive force (Hc) of the magnetic recording medium is as high as more than 3000 Oe, the current at which a writing operation is performed becomes so high that the head core of a magnetic head which is widely used at present is magnetically saturated due to an insufficient saturation flux density (Bm). As a result, it is impossible to sufficiently magnetize the magnetic recording medium.

A ferrite head is widely used in a magnetic recording and reading-out machine which corresponds to a magnetic recording medium having a coercive force of not more than 1000 Oe, while a head such as a Sendust head, an amorphous head and a thin-film head, whose head core is made of a material having a high saturation flux density, is used in a magnetic recording and reading-out machine which corresponds to a magnetic recording medium having a coercive force of more than 1000 Oe.

As a perpendicular magnetic film for magnetic recording, an amorphous alloy film such as a CoCr alloy film and a CoPt alloy film, a spinel oxide thin film such as a cobalt ferrite film (Japanese Patent Application Laid-Open (KOKAI) Nos. 51-119999 (1976), 63-47359 (1988), 3-17813 (1991), 3-188604 (1991) and 4-10509 (1992)), a magneto plumbite oxide thin film such as a barium ferrite film (Japanese Patent Application Laid-Open (KOKAI) No. 62-267949 (1987)) and the like have conventionally been proposed.

Examples of the perpendicular magnetic recording films and processes for producing the same which have conventionally been disclosed are set forth below, concretely.

(i) A process for producing a cobalt ferrite spinel film, which comprises forming a spinel film by sputtering onto a substrate of a low temperature in an oxidizing air by using an alloy target composed mainly of Co and Fe (Japanese Patent Application Laid-Open (KOKAI) No. 63-47359). In Japanese Patent Application Laid-Open (KOKAI) No. 63-47359, the description of "When a reactive sputtering is carried out in an oxidizing air by using an alloy target composed mainly of Co and Fe, a cobalt.ferrite spinel film represented by $Co_xFe_{3-x}O_4$, (wherein $0.5 \leq x \leq 1.05$) is formed on the substrate. In this case, even if the surface temperature is as low as about 200° C., a spinel film having a good crystallizability is obtained." is disclosed.

(ii) A magnetic recording medium comprising a substrate, an under layer of a crystalline film having a spinel crystalline structure, and a magnetic recording layer of a spinel ferrite crystalline film, wherein the lattice constant of the under layer is larger than that of the magnetic recording layer (Japanese Patent Application Laid-Open (KOKAI) No. 3-17813). The description of "The under layer is composed of a material represented by the following general formula:

$$AB_2O_4$$

wherein A is a metal element of divalent ions and at least one selected from the group consisting of Mg, Mn, Co, Ni, Cu, Zn, Fe, etc., and B is a metal element of trivalent ions and at least one selected from the group consisting of Cr, In, Rh, Sc, Tl, Fe, etc. The magnetic recording layer 3 is composed of the material represented by the following general formula:

$$AB_xFe_{3-x}O_4$$

wherein A and B are the same as in the above-mentioned general formula, and $0 \leq x < 2$ ." is disclosed in Japanese Patent Application Laid-Open (KOKAI) No. 3-17813.

(iii) An oriented film of oxide crystals represented by the following general formula:

$$A_xB_{3-x}O_y$$

wherein A is at least one selected from the group consisting of Mn, Co, Ni, Cu, Mg, Cr, Zn, Li and Ti; B is Fe or Al;, $0.5 \leq x \leq 2.0$ and $2.5 \leq y \leq 4$, wherein the ratio $(I_{111}/I_{222})$ of the reflective peak intensity $I_{111}$ of the crystal face (111) and the reflective peak intensity $I_{222}$ of the crystal face (222) is less than 0.2 when the X-ray diffraction peak is indexed on the assumption that the film has a spinel crystalline structure (Japanese Patent Application Laid-Open (KOKAI) No. 3-188604).

(iv) A process for producing a cobalt ferrite film comprising the steps of forming a multi-layer metal film by laminating at least two of Co layer and Fe layer on a substrate, and heat-treating the obtained multi-layer film in an air containing oxygen (Japanese Patent Application Laid-Open (KOKAI) No. 4-10509).

There are the following description in Japanese Patent Application Laid-Open (KOKAI) No. 4-10509.

"The total thickness of the Co layer and the Fe layer in the multi-layer metal film is not more than 100 Å. This is because if the total thickness of the Co layer and Fe layer exceeds 100 Å, it is difficult to produce a cobalt ferrite film having a large Kerr rotation angle."

"Seven kinds of multilayers were formed on a glass substrate 3 (Coning 7059, produced by CONING) by sputtering in Ar while using a single Co target and a single Fe target under the following condition, as shown in FIG. 1.

Sputtering condition:
Total sputtering pressure: 2 mtorr
Sputtering current: 0.2 A
Substrate temperature: room temperature In each of the multilayers, the thickness ratio of a Co layer 1 and an Fe layer 2 was 1:2, and the total film thickness was constantly 2000 Å. These multilayers obtained were 1 layer of (Co/Fe=660 Å/1340 Å), 2 layers of (Co/Fe=330 Å/670 Å), 4 layers of (Co/Fe=165 Å/335 Å), 8 layers of (Co/Fe=82.5 Å/167.5 Å), 10 layers of (Co/Fe=66 Å/134 Å), 20 layers of (Co/Fe=33 Å/67 Å), and 40 layers of (Co/Fe=17 Å/33 Å). Each of the multilayers was heat-treated in an electric oven in the air in the heat treatment pattern shown in FIG. 3. More specifically, the film was heated at a high raising rate until 300° C., and then heated at a raising rate of 100° C./hr until 500° C. The film was heated at 500° C. for 2 hours, and was then gradually cooled. Thus, a cobalt ferrite film was formed on the glass substrate."

Namely, the cobalt ferrite films disclosed in Japanese Patent Application Laid-Open (KOKAI) No. 4-10509 are a multilayer (in-plane magnetic film) composed of a cobalt layer and a ferrite layer and a film (perpendicular magnetic film) composed of a cobalt.ferrite oxide. Each of the multi-layer metal films is heat-treated at a temperature of not lower than 500° C. for not less than 2 hours, thereby obtaining a cobalt.ferrite oxide film.

(v) An amorphous alloy film such as a Gd—Co film and a Tb—Fe film, composed of a rare earth metal and a transition metal (Japanese Patent Application Laid-Open (KOKAI) No. 51-119999) and a magneto-plumbite oxide thin film such as a barium ferrite film (Japanese Patent Application Laid-Open (KOKAI) No. 62-267949).

Among the above-described perpendicular magnetic films, the cobalt ferrite films which are typical of spinel oxides are stable against oxidation, because they are oxides, and have a large crystalline magnetic anisotropy. Owing to these magnetic characteristics the cobalt ferrite films are considered to be promising as a perpendicular magnetic recording medium.

As the process for producing a cobalt ferrite ($CoFe_2O_4$) film, various methods such as sputtering method, vacuum evaporation method and MO-CVD method are known.

However, although a perpendicular magnetic film which has an excellent oxidation resistance, an excellent anticorrosivity, and an appropriate coercive force for preventing a magnetic saturation of a head which is widely used at present is now in the strongest demand, none of the conventional magnetic thin films sufficiently meet these requirements.

For example, a cobalt ferrite ($CoFe_2O_4$) film produced by a sputtering method is disadvantageous in that although the easy magnetization axis of a cobalt ferrite ($CoFe_2O_4$) film is (100) axis to the plane (400), the plane (400) is likely to orient at random or the plane (111) is likely to orient in parallel with the substrate, so that it is difficult to produce a perpendicular magnetic film. As examples of a method for obtaining a cobalt ferrite ($CoFe_2O_4$) film in which the plane (400) is predominantly oriented in parallel with the substrate, (1) the method described in *Proceedings of the 9-th Meeting of Magnetic Society of Japan* 29PB-10, (2) the method described in *Proceedings of the 13-th Meeting of Magnetic Society of Japan*, p 246, and (3) the method described in Japanese Patent Application Laid-Open (KOKAI) No. 4-10509 (1992) are known.

The method (1) is a method of depositing Fe and Co ionized in an oxygen plasma on an $MgAl_2O_4$ substrate or a silica glass substrate heated to 500° C. Since it is necessary to maintain the substrate temperature at a high temperature such as not lower than 500° C. during film formation, the productivity is poor. In addition, in order to raise the substrate temperature to not lower than 500 ° C., the substrate itself is required to have a high heat-resistance. However, the heat-resistance of glass plastics or the like, which is widely used as a material of the substrate for a perpendicular magnetic recording medium, is insufficient. In this way, since the material of the substrate is limited, it is not advantageous either industrially or economically.

The method (2) is a plasma-excitation MO-CVD method. Since it is necessary to maintain the substrate temperature at 300° to 400° C. in a vacuum during film formation, the productivity is poor, which is industrially and economically disadvantageous.

The method (3) is a method of annealing a multilayered metal film produced by laminating at least two layers of Co and Fe at a temperature of not lower than 500° C. in an atmosphere containing oxygen. Since a high temperature is necessary, the material of the substrate is limited, as described above, which is disadvantageous industrially and economically.

Accordingly, it is required to eliminate the above-described problems in the related art and to provide a perpendicular magnetic film which is composed of an oxide having a spinel crystal structure, and which has an excellent oxidation resistance, an excellent anticorrosivity and an appropriate coercive force.

Also, it is a technical problem to be solved of the present invention to provide a process for producing a perpendicular magnetic film of an oxide having a spinel crystal structure and showing an excellent oxidation resistance, an excellent anticorrosivity and an appropriate coercive force, at a temperature of lower than 500° C. and as low as possible with industrial and economical advantages.

As a result of the present inventors' studies, it has been found that by annealing a Co- and Ni-containing multilayered film comprising as one unit a magnetite [$FeOx \cdot Fe_2O_3$ ($0<x\leq1$)] layer which contains or does not contain Co and/or Ni and an oxide layer which contains Co and/or Ni (provided that the magnetite layer and the oxide layer are multilayered so as to contain both Co and Ni as a whole unit), which are formed a substrate, the plane (400) of the multilayered film being predominantly oriented in parallel with the substrate, the thickness of one unit being not more than 300 Å, the molar ratio of Co to Fe being 0.005 to 0.32, and the molar ratio of Ni to Co being not less than 0.6, at a temperature of 280° to 450° C., the thus-obtained perpendicular magnetic film an excellent oxidation resistance, an excellent anticorrosivity and an appropriate coercive force, for example, less than 3,000 Oe. On the basis of the finding, the present invention has been attained.

SUMMARY OF THE INVENTION

It is an object of the present invention to provide a perpendicular magnetic film which is composed of an oxide having a spinel crystal structure, and which has an excellent oxidation resistance, an excellent anticorrosivity and an appropriate coercive force.

To achieve this aim, in a first aspect of the present invention, there is provided a perpendicular magnetic film comprising a spinel thin film formed on a substrate, which contains Fe as the main ingredient and further contains Co and Ni, in which the plane (400) is predominantly oriented in parallel with the substrate, the spacing of the plane (400) is not more than 2.082 Å, the molar ratio of Co to Fe is 0.005 to 0.32 and the molar ratio of Ni to Co is at least 0.6, and which has a coercive force of less than 3000 Oe.

In a second aspect of the present invention, there is provided a Co- and Ni-containing multilayered film comprising a multiplicity of units formed on a substrate, each unit composed of a magnetite [FeOx·Fe$_2$O$_3$ (0<x≦1)] layer which contains or does not contain Co and/or Ni and an oxide layer which contains Co and/or Ni (provided that the magnetite layer and the oxide layer are multilayered so as to contain both Co and Ni as a whole unit), the plane (400) thereof being predominantly oriented in parallel with the substrate, one unit having a thickness of not more than 300 Å, the molar ratio of Co to Fe is 0.005 to 0.32, and the molar ratio of Ni to Co being at least 0.6.

In a third aspect of the present invention, there is provided a process for producing the perpendicular magnetic film as defined in the first aspect, comprising annealing the Co- and Ni-containing multilayered film as defined in the second aspect at a temperature of 280° to 450° C.

DETAILED DESCRIPTION OF THE INVENTION

Figure 1A:
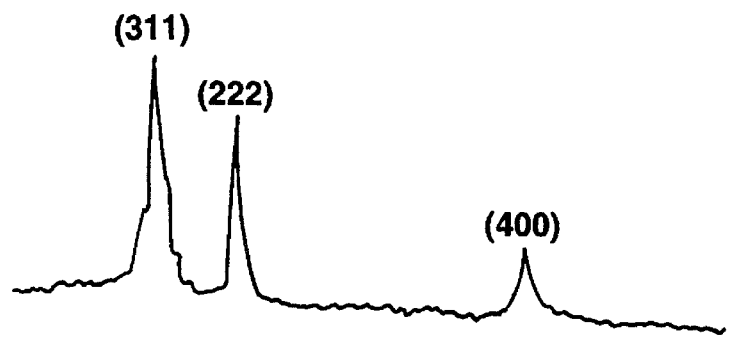
FIGS. 1(a) to 1(c) show the X-ray diffraction spectra of multilayered films.

A perpendicular magnetic film according to the present invention is a spinel thin film formed on a substrate, containing Fe as the main ingredient and further containing Co and Ni. The plane (400) of the perpendicular magnetic film formed on a substrate is predominantly oriented in parallel with the substrate and the spacing of the plane (400) of the perpendicular magnetic film is not more than 2.082 Å, preferably 2.070 to 2.080 Å. The molar ratio of Co to Fe in the thin film is 0.005 to 0.32, preferably 0.01 to 0.20 and the molar ratio of Ni to Co therein is not less than 0.6, preferably 1.0 to 5.0. The coercive force of the perpendicular magnetic film is less than 3000 Oe, preferably 1200 to 2500 Oe.

In the present invention, the spacing of the plane (400) in the spinel thin film containing Fe as the main ingredient and further containing Co and Ni is not more than 2.082 Å. The spinel thin film of the present invention is a thin film wherein Fe$^{2+}$ in the magnetite which constitutes the multilayered film is completely oxidized into Fe$^{3+}$, and also includes a thin film in which a slight amount of Fe$^{2+}$ in the magnetite remains.

When the plane (400) of a film is not predominantly oriented in parallel with the substrate, or when the spacing of the plane (400) of a film exceeds 2.082 Å, the magnetization film does not constitute a perpendicular magnetic film.

If the molar ratio of Co to Fe is less than 0.005, it is difficult to produce a perpendicular magnetic film. In order to facilitate the production of a spinel thin film in which the plane (400) is predominantly oriented in parallel with the substrate, the molar ratio of Co to Fe is preferably not less than 0.01. If the molar ratio of Co to Fe exceeds 0.32, it is difficult to oxidize a magnetite, in other words, to transform magnetite [FeOx·Fe$_2$O$_3$ (0<x≦1)] into γ-Fe$_2$O$_3$, or to diffuse the Co ions and Ni ions in the spinel oxide layer composed of Fe as the main ingredient at a temperature of not higher than 450° C.

If the molar ratio of Ni to Co is less than 0.6, it is difficult to obtain a perpendicular magnetic film having a coercive force of less than 3000 Oe. In order to obtain a coercive force of not more than 2500 Oe, which is more preferable from the point of view of prevention of the magnetic saturation of a magnetic head, the molar ratio of Ni to Co is preferably not less than 1.0. The larger the Ni content, the smaller the coercive force is apt to become. With consideration for a preferable coercive force, the upper limit of the molar ratio of Ni to Co is not more than 5.0, preferably not more than 3.0. When the molar ratio of Ni to Co is 5.0, the coercive force is about 800 Oe, and when the molar ratio of Ni to Co is 3.0, the coercive force is about 1300 Oe.

If the coercive force of a perpendicular magnetic film of the present invention is more than 3000 Oe, it is impossible to prevent a magnetic saturation of a magnetic head which is widely used at present. From the point of view of prevention of the magnetic saturation of a magnetic head, the coercive force is preferably not more than 2500 Oe, more preferably 1200 to 2500 Oe.

A perpendicular magnetic film according to the present invention is produced by annealing at a temperature of 280° to 450° C., preferably 290° to 400° C. a Co- and Ni-containing multilayered film composed of as one unit a magnetite [FeOx·Fe$_2$O$_3$ (0<x≦1)] layer which contains or does not contain Co and/or Ni and an oxide layer which contains Co and/or Ni (provided that the magnetite layer and the oxide layer are multilayered so as to contain both Co and Ni as a whole unit), which are formed on a substrate, wherein the plane (400) is predominantly oriented in parallel with the substrate, one unit has a thickness of not more than 300 Å, the molar ratio of Co to Fe is 0.005 to 0.32, and the molar ratio of Ni to Co is at least 0.6.

A multilayered film according to the present invention is a Co- and Ni-containing multilayered film composed of a multiplicity of units formed on a substrate, each unit composed of a magnetite [FeOx·Fe$_2$O$_3$ (0<x≦1)] layer which contains or does not contain Co and/or Ni and an oxide layer which contains Co and/or Ni (provided that the magnetite layer and the oxide layer are multilayered so as to contain both Co and Ni as a whole unit). Such a multilayered film can be produced by any of a reactive sputtering method in which a composite metal target (composed of an Fe target which contains or does not contain Co and/or Ni, and a metal target which contains one selected from Co, Ni, Co—Ni alloy, and Co and Ni) are sputtered in an oxidizing atmosphere; a direct method in which an oxidized film is directly formed from a sintered target of magnetite [FeOx·Fe$_2$O$_3$ ($0<x\leq1$)] which contains or does not contain Co and/or Ni and a sintered target of an oxide which contains Co and/or Ni; and a reactive evaporation method in which metals (Fe which contains or does not contain Co and/or Ni, and one selected from the group consisting of Co, Ni, Co—Ni alloy, and Co and Ni) are evaporated in an oxidizing atmosphere.

An example of layers which constitutes the unit in the Co- and Ni-containing multilayered film used in the present invention is as follows.

(1) Co- and Ni-containing magnetite layer/Co oxide layer
(2) Co- and Ni-containing magnetite layer/Ni oxide layer
(3) Co- and Ni-containing magnetite layer/Co and Ni oxides layer
(4) Co-containing magnetite layer/Ni oxide layer
(5) Co-containing magnetite layer/Co and Ni oxides layer
(6) Ni-containing magnetite layer/Co oxide layer
(7) Ni-containing magnetite layer/Co and Ni oxides layer
(8) Magnetite layer/Co and Ni oxides layer The Co oxide layer is composed of Co oxide having NaCl-type crystalline structure and the Ni oxide layer is composed of Ni oxide having NaCl-type crystalline structure. Also, the Co and Ni oxides layer is composed of Co and Ni oxides having NaCl-type crystalline structure.

As the material of the substrate in the present invention, commercially available materials such as soda-lime glass are usable.

In a multilayered film according to the present invention, the thickness of one unit is not more than 300 Å, preferably 50 to 250 Å, and the molar ratio of Co to Fe is 0.005 to 0.32. It is difficult to obtain a perpendicular magnetic film according to the present invention by using a multilayered film in which the thickness of one unit exceeds 300 Å or a multilayered film in which the molar ratio of Co to Fe is less than 0.005 or more than 0.32.

The molar ratio of Ni to Co in the multilayered film of the present invention is at least 0.6. If it is less than 0.6, the coercive force of the perpendicular magnetic film obtained by annealing the multilayered film exceeds 3000 Oe.

The multilayered film of the present invention is composed of at least three units, each unit being composed of a magnetite [FeOx·Fe$_2$O$_3$ ($0<x\leq1$)] layer which contains or does not contain Co and/or Ni and an oxide layer which contains Co and/or Ni (provided that the magnetite layer and the oxide layer are multilayered so as to contain both Co and Ni as a whole unit). Since the thickness of a perpendicular magnetic film is preferably about 500 to 5000 Å, more preferably 500 to 3000 Å in practical use, the number of units is determined so as to produce a film of a desired thickness.

The annealing temperature of the multilayered film of the present invention is 280° to 450° C., preferably 290° to 400° C. The annealing time is preferably 0.8 to 5 hours. If the annealing temperature is lower than 280° C., the oxidation of the magnetite [FeOx·Fe$_2$O$_3$ ($0<x\leq1$)], i.e., the transformation of magnetite [FeOx·Fe$_2$O$_3$ ($0<x\leq1$)] into $\gamma$-Fe$_2$O$_3$ or the diffusion of Co and Ni in the spinel thin film composed of Fe as the main ingredient is insufficient for obtaining a perpendicular magnetic film of the present invention. If the annealing temperature exceeds 450° C., the transformation $\gamma$-Fe$_2$O$_3$ into $\alpha$-Fe$_2$O$_3$ begins to take place so that it is impossible to produce a perpendicular magnetic film according to the present invention.

In annealing, the transformation temperature for oxidizing the magnetite [FeOx·Fe$_2$O$_3$ ($0<x\leq1$)] i.e. transforming magnetite [FeOx·Fe$_2$O$_3$ ($0<x\leq1$)] into $\gamma$-Fe$_2$O$_3$ is lowered by adding Cu to the spinel thin film, as described in, for example, Japanese Patent Application Laid-Open (KOKAI) No. 57-54309 (1982). It is possible to produce a similar effect by adopting this method in the present invention. Annealing may be carried out in two stages: the magnetite [FeOx·Fe$_2$O$_3$ ($0<x\leq1$)] is first oxidized (FeOx·Fe$_2$O$_3$ ($0<x\leq1$) is first transformed into $\gamma$-Fe$_2$O$_3$) at a temperature of 240° to 320° C., and Co and Ni are then diffused at a temperature of 280° to 450° C. In this case, it is possible to suppress the production of a crack which is likely to be caused during the oxidation of the magnetite (transformation of FeOx·Fe$_2$O$_3$ ($0<x\leq1$) into $\gamma$-Fe$_2$O$_3$).

What is the most important in the present invention is that the perpendicular magnetic film of the present invention is produced by annealing a Co- and Ni-containing multilayered film composed of a multiplicity of units formed on a substrate, each unit composed of a magnetite [FeOx·Fe$_2$O$_3$ ($0<x\leq1$)] which contains or does not contain Co and/or Ni and an oxide layer which contains Co and/or Ni (provided that the magnetite layer and the oxide layer are multilayered so as to contain both Co and Ni as a whole unit), wherein the plane (400) thereof is predominantly oriented in parallel with the substrate, one unit has a thickness of not more than 300 Å, the molar ratio of Co to Fe is 0.005 to 0.32, and the molar ratio of Ni to Co is not less than 0.6.

Figure 1B:
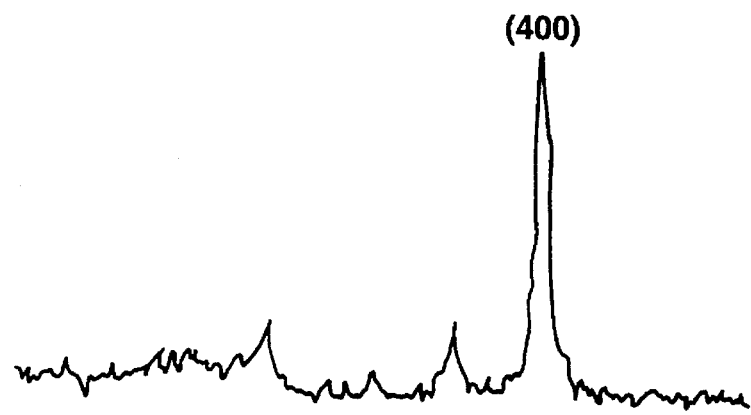
Figure 1C:
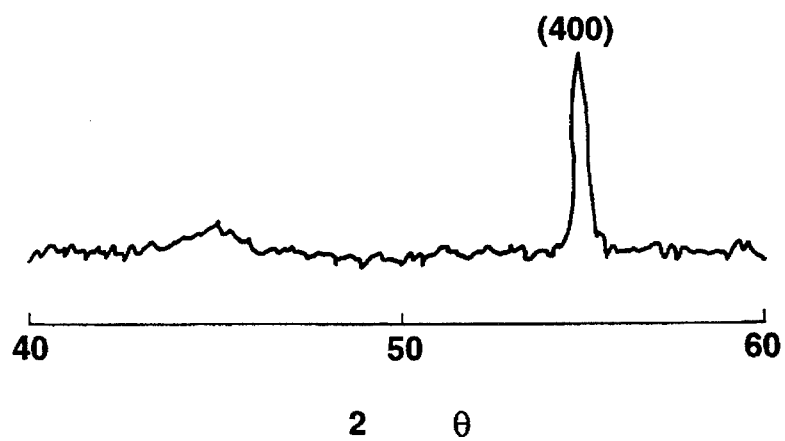

This has been confirmed from the fact that a perpendicular magnetic film according to the present invention cannot be obtained either by using a multilayered film in which the molar ratio of Co to Fe is between 0.005 and 0.32 but, the thickness of one unit composed of a magnetite [FeOx·Fe$_2$O$_3$ ($0<x\leq1$)] layer which contains or does not contain Co and/or Ni and an oxide layer which contains Co and/or Ni (provided that the magnetite layer and the oxide layer are multilayered so as to contain both Co and Ni as a whole unit) exceeds 300 Å, so that the planes (311) and (222) are predominantly oriented in parallel with the substrate, or by using a multilayered film in which the thickness of one unit of a magnetite [FeOx·Fe$_2$O$_3$ ($0<x\leq1$)] layer which contains or does not contain Co and/or Ni and an oxide layer which contains Co and/or Ni (provided that the magnetite layer and the oxide layer are multilayered so as to contain both Co and Ni as a whole unit) is not more than 300 Å, but the molar ratio of Co to Fe is not in the range of 0.005 to 0.32, so that the plane (400) thereof is predominantly oriented in parallel with the substrate as shown in later-described Comparative Examples 3 and 4, and in FIGS. 1(*a*) and 1(*b*).

The coercive force of a conventional cobalt ferrite (CoFe$_2$O$_4$) film is dependent upon the Co content, and the more the Co content therein increases, the more the coercive force thereof raises. On the other hand, the coercive force of a perpendicular magnetic film of the present invention is not largely dependent upon the Co content but is approximately determined by the molar ratio of Ni to Co. For this reason, it is possible to control the coercive force of the perpendicular magnetic film only by the molar ratio of Ni to Co and to obtain a desired coercive force with stability and good reproducibility.

The reason why the perpendicular magnetic film of the present invention is not largely dependent upon the Co content is considered to be as follows.

The coercive force of a conventional cobalt ferrite ($CoFe_2O_4$) film is changed by utilizing the crystalline magnetic anisotropy. In contrast, in a perpendicular magnetic film of the present invention, the spacing of the plane (400) thereof is not more than 2.082 Å, as shown in the later-described example, which is even smaller than 2.086 Å which is the spacing of the plane (400) of $\gamma$-$Fe_2O_3$ which have the smallest spacing of the plane (400) in any other spinel crystal structure mainly composed of Fe. From these facts, it has been considered that the magnetostrictive anisotropy due to the strain of the lattice is imparted to the perpendicular magnetic film of the present invention in addition to the crystalline magnetic anisotropy due to cobalt.

That the small spacing of the perpendicular magnetic film of the present invention is not caused by the shrinkage or the like of the substrate but is due to the film itself has been confirmed from the fact that the spacing of the film produced by transforming a monolayer $Fe_3O_4$ film (2000 Å) in which the plane (222) thereof is oriented in parallel with the same glass substrate as that of the perpendicular magnetic film of the present invention into a $\gamma$-$Fe_2O_3$ film was 2.407 Å, which is approximately the same as 2.408 Å of the bulk value.

A perpendicular magnetic film of the present invention has a coercive force of not more than 3000 Oe, preferably 1200 to 2500 Oe, a saturation magnetization of not less than 200 emu/cc (2500 G), and a squareness of not less than 0.20, preferably not less than 0.40.

The perpendicular magnetic film of the present invention is excellent in oxidation resistance and anticorrosivity, because the perpendicular magnetic film is composed of an oxide, and is suitable as a magnetic recording medium for high-density magnetic recording, because the perpendicular magnetic film comprises a spinel thin film composed of Fe as the main ingredient which has an appropriate coercive force, particularly, a coercive force of less than 3000 Oe.

According to a process for producing a perpendicular magnetic film of the present invention, it is not necessary to heat the substrate to not lower than 300° C. during film formation in a vacuum, and it is possible to produce a perpendicular magnetic film by annealing at a low temperature such as not higher than 500° C. The process of the present invention is therefore very advantageous both industrially and economically.

EXAMPLES

The present invention will be explained in more detail hereinunder with reference to the following examples and comparative examples.

In the following examples and comparative examples, the magnetic characteristics were measured by using "Vibration Sample Magnetometer VSM-3S-15", manufactured by Toei Kogyo K.K.

Example 1

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 200° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 60 Å as a first layer.

The shutter was next rotated to form a Co- and Ni-containing oxide layer (the molar ratio of Ni to Co is 1.1) to a thickness of 5 Å as a second layer by sputtering the Co—Ni target at a deposition rate of 42 Å/min. The first layer and the second layer constituted one unit having a thickness of 65 Å. The molar ratio of Co to Fe in one unit was 0.06. These operations were alternately repeated 68 times to obtain a multilayered film composed of 34 $Fe_3O_4$ layers each having a thickness of 60 Å, and 34 Co- and Ni-containing oxide layers each having a thickness of 5 Å.

The making power at the time of film formation was 300 W on the Fe side and 300 W on the Co—Ni side. In the thus-obtained multilayered film, the plane (400) was predominantly oriented in parallel with the substrate, as shown in the X-ray diffraction spectrum in FIG. 1(c).

The obtained multilayered film was annealed in the air at a temperature of 350° C. for 2 hours so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Figure 2:
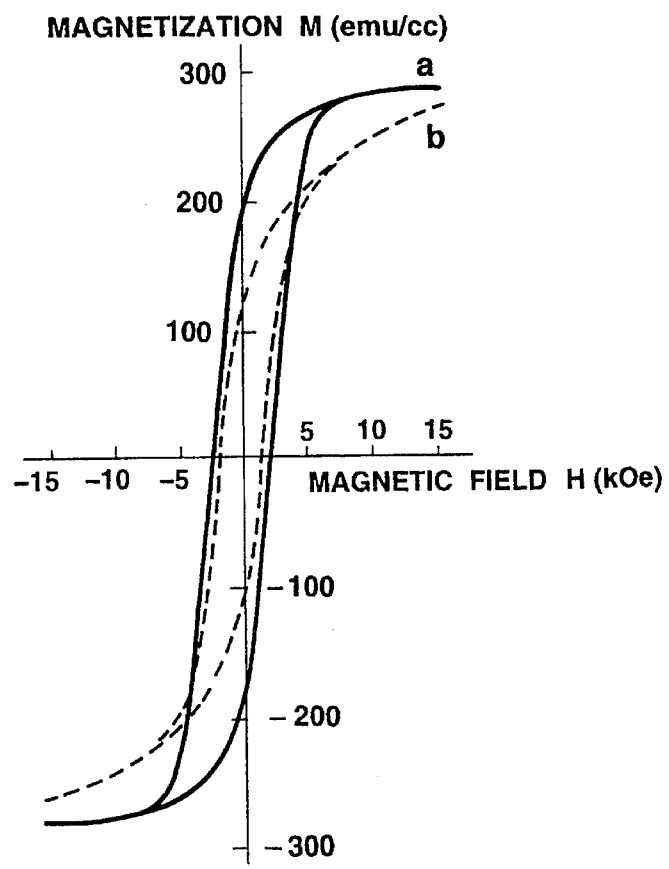
FIG. 2 shows the magnetization curves of the perpendicular magnetic film obtained in Example 1.

The magnetization curve of the thus-obtained spinel thin film is shown in FIG. 2. In FIG. 2, the solid line a shows the magnetization curve of the spinel thin film to which a magnetic field was applied in the perpendicular direction, and the broken line b shows the magnetization curve of the spinel thin film to which a magnetic field was applied in the in-plane direction. As shown in FIG. 2, since the residual magnetization and the coercive force of the solid line a were larger than those of the broken line b, the spinel thin film was recognized as a perpendicular magnetic film. As to the magnetic characteristics of the perpendicular magnetic film, the saturation magnetization was 260 emu/cc (3300 G), the coercive force was 2.2 kOe, and the squareness was 0.63. The spacing of the plane (400) was 2.077 Å.

Example 2

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 280° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 54 Å as a first layer.

The shutter was next rotated to form a Co- and Ni-containing oxide layer (the molar ratio of Ni to Co is 1.1) to a thickness of 6 Å as a second layer by sputtering the Co—Ni target at a deposition rate of 42 Å/min. The first layer and the second layer constituted one unit having a thickness of 60 Å. The molar ratio of Co to Fe in one unit was 0.08. These operations were alternately repeated 68 times to obtain a multilayered film composed of 34 $Fe_3O_4$ layers each having a thickness of 54 Å, and 34 Co- and Ni-containing oxide layers each having a thickness of 6 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 400° C. for 1 hour so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Figure 3:
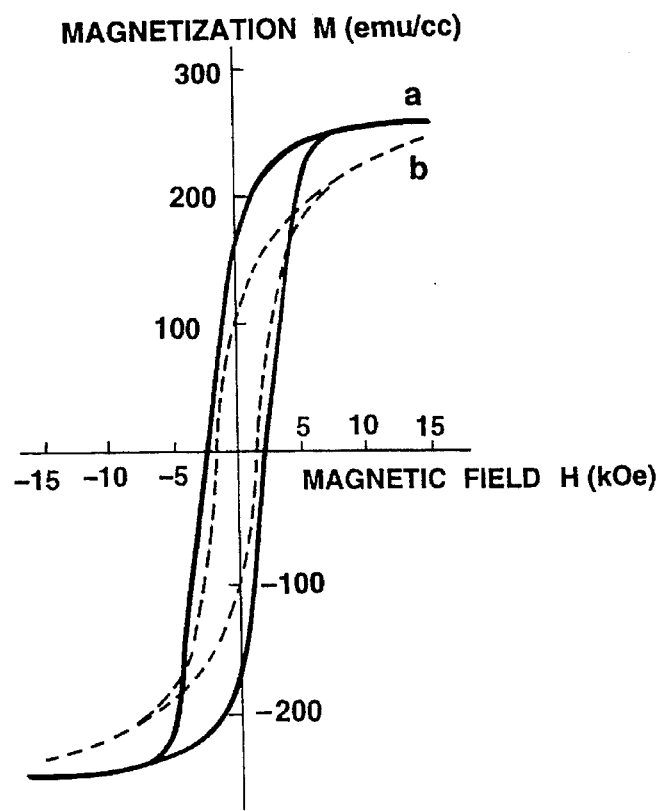
FIG. 3 shows the magnetization curves of the perpendicular magnetic film obtained in Example 2.

The magnetization curve of the thus-obtained spinel thin film is shown in FIG. 3. In FIG. 3, the solid line a shows the magnetization curve of the spinel thin film to which a magnetic field was applied in the perpendicular direction, and the broken line b shows the magnetization curve of the spinel thin film to which a magnetic field was applied in the in-plane direction. As shown in FIG. 3, since the residual magnetization and the coercive force of the solid line a were larger than those of the broken line b, the spinel thin film was recognized as a perpendicular magnetic film. As to the magnetic characteristics of the perpendicular magnetic film, the saturation magnetization was 240 emu/cc (3000 G), the coercive force was 2.2 kOe, and the squareness was 0.64. The spacing of the plane (400) was 2.076 Å.

Example 3

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 180° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 54 Å as a first layer.

The shutter was next rotated to form a Co- and Ni-containing oxide layer (the molar ratio of Ni to Co is 1.1) to a thickness of 9 Å as a second layer by sputtering the Co—Ni target at a deposition rate of 42 Å/min. The first layer and the second layer constituted one unit having a thickness of 63 Å. The molar ratio of Co to Fe in one unit was 0.12. These operations were alternately repeated 68 times to obtain a multilayered film composed of 34 $Fe_3O_4$ layers each having a thickness of 54 Å, and 34 Co- and Ni-containing oxide layers each having a thickness of 9 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 400° C. for 1 hour so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Figure 4:
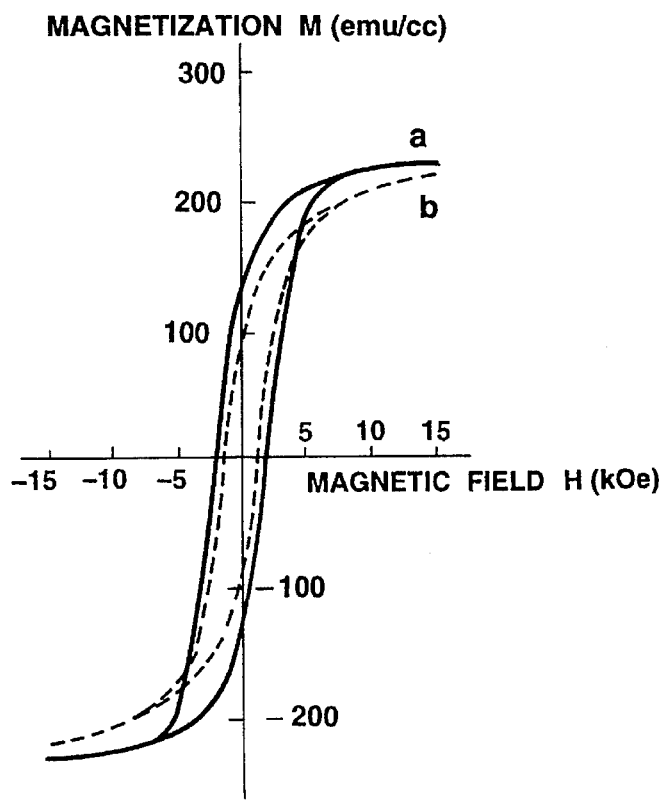
FIG. 4 shows the magnetization curves of the perpendicular magnetic film obtained in Example 3.

The magnetization curve of the thus-obtained spinel thin film is shown in FIG. 4. In FIG. 4, the solid line a shows the magnetization curve of the spinel thin film to which a magnetic field was applied in the perpendicular direction, and the broken line b shows the magnetization curve of the spinel thin film to which a magnetic field was applied in the in-plane direction. As shown in FIG. 4, since the residual magnetization and the coercive force of the solid line a were larger than those of the broken line b, the spinel thin film was recognized as a perpendicular magnetic film. As to the magnetic characteristics of the perpendicular magnetic film, the saturation magnetization was 210 emu/cc (2700 G), the coercive force was 2.1 kOe, and the squareness was 0.57. The spacing of the plane (400) was 2.077 Å.

Example 4

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 280° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 80 Å as a first layer.

The shutter was next rotated to form a Co- and Ni-containing oxide layer (the molar ratio of Ni to Co is 1.5) to a thickness of 9 Å as a second layer by sputtering the Co—Ni target at a deposition rate of 4 2 Å/min. The first layer and the second layer constituted one unit having a thickness of 89 Å. The molar ratio of Co to Fe in one unit was 0.07. These operations were alternately repeated 68 times to obtain a multilayered film composed of 34 $Fe_3O_4$ layers each having a thickness of 80 Å, and 34 Co- and Ni-containing oxide layers each having a thickness of 9 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 400° C. for 1 hour so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Figure 5:
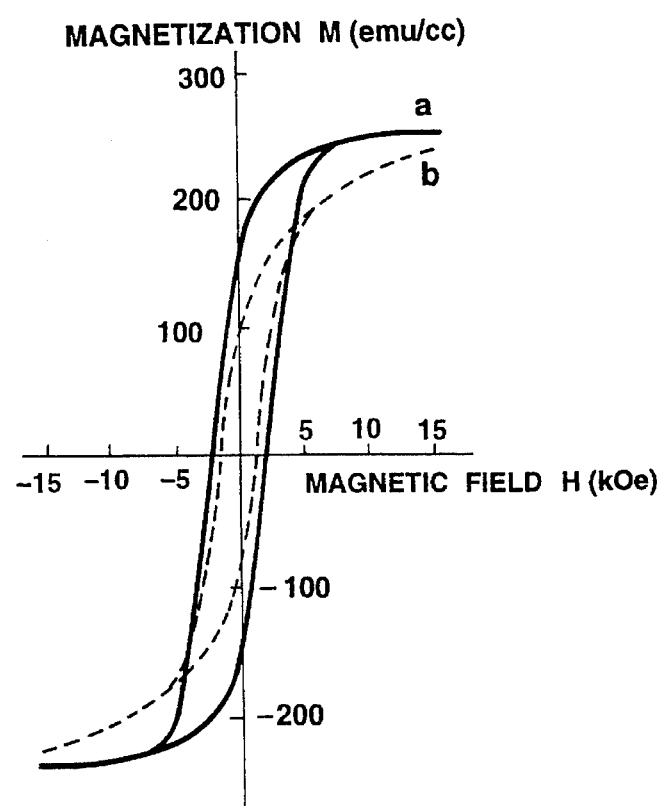
FIG. 5 shows the magnetization curves of the perpendicular magnetic film obtained in Example 4.

The magnetization curve of the thus-obtained spinel thin film is shown in FIG. 5. In FIG. 5, the solid line a shows the magnetization curve of the spinel thin film to which a magnetic field was applied in the perpendicular direction, and the broken line b shows the magnetization curve of the spinel thin film to which a magnetic field was applied in the in-plane direction. As shown in FIG. 5, since the residual magnetization and the coercive force of the solid line a were larger than those of the broken line b, the spinel thin film was recognized as a perpendicular magnetic film. As to the magnetic characteristics of the perpendicular magnetic film, the saturation magnetization was 230 emu/cc (2900 G), the coercive force was 2.0 kOe, and the squareness was 0.61. The spacing of the plane (400) was 2.074 Å.

Example 5

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 200° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 56 Å as a first layer.

The shutter was next rotated to form a Co- and Ni-containing oxide layer (the molar ratio of Ni to Co is 2.7) to a thickness of 7 Å as a second layer by sputtering the Co—Ni target at a deposition rate of 42 Å/min. The first layer and the second layer constituted one unit having a thickness of 63 Å. The molar ratio of Co to Fe in one unit was 0.05. These operations were alternately repeated 68 times to obtain a multilayered film composed of 34 $Fe_3O_4$ layers each having a thickness of 56 Å, and 34 Co- and Ni-containing oxide layers each having a thickness of 7 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 400° C. for 1 hour so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Figure 6:
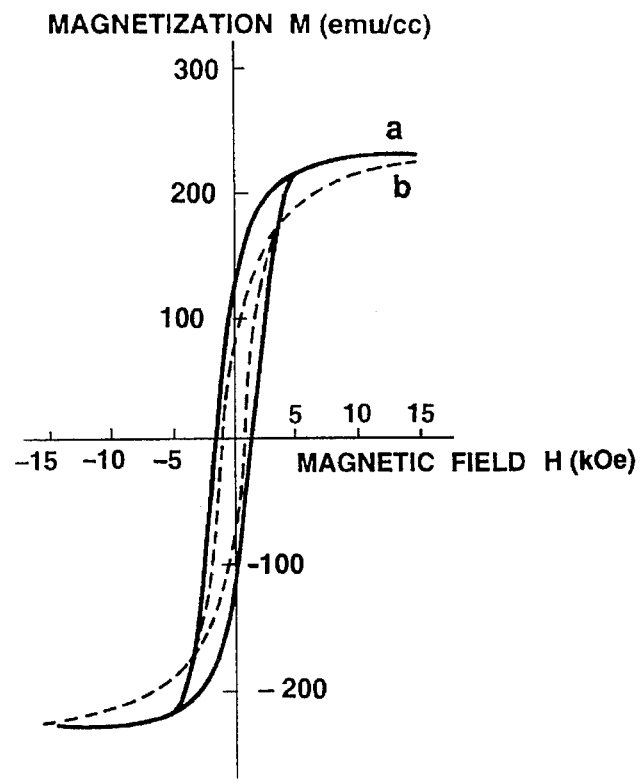
FIG. 6 shows the magnetization curves of the perpendicular magnetic film obtained in Example 5.

The magnetization curve of the thus-obtained spinel thin film is shown in FIG. 6. In FIG. 6, the solid line a shows the magnetization curve of the spinel thin film to which a magnetic field was applied in the perpendicular direction, and the broken line b shows the magnetization curve of the spinel thin film to which a magnetic field was applied in the in-plane direction. As shown in FIG. 6, since the residual magnetization and the coercive force of the solid line a were larger than those of the broken line b, the spinel thin film was recognized as a perpendicular magnetic film. As to the magnetic characteristics of the perpendicular magnetic film, the saturation magnetization was 210 emu/cc (2700 G), the coercive force was 1.3 kOe, and the squareness was 0.48. The spacing of the plane (400) was 2.075 Å.

Example 6

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 200° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 130 Å as a first layer.

The shutter was next rotated to form a Co- and Ni-containing oxide layer (the molar ratio of Ni to Co is 1.5) to a thickness of 6 Å as a second layer by sputtering the Co—Ni target at a deposition rate of 30 Å/min. The first layer and the second layer constituted one unit having a thickness of 136 Å. The molar ratio of Co to Fe in one unit was 0.015. These operations were alternately repeated 30 times to obtain a multilayered film composed of 15 $Fe_3O_4$ layers each having a thickness of 130 Å, and 15 Co- and Ni-containing oxide layers each having a thickness of 6 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 380° C. for 2 hours so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Figure 7:
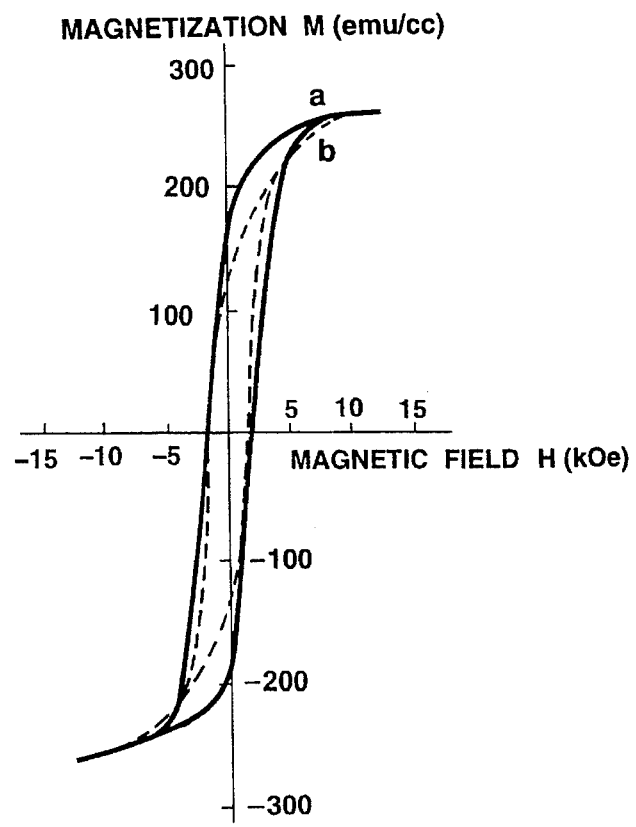
FIG. 7 shows the magnetization curves of the perpendicular magnetic film obtained in Example 6.
Figure 8:
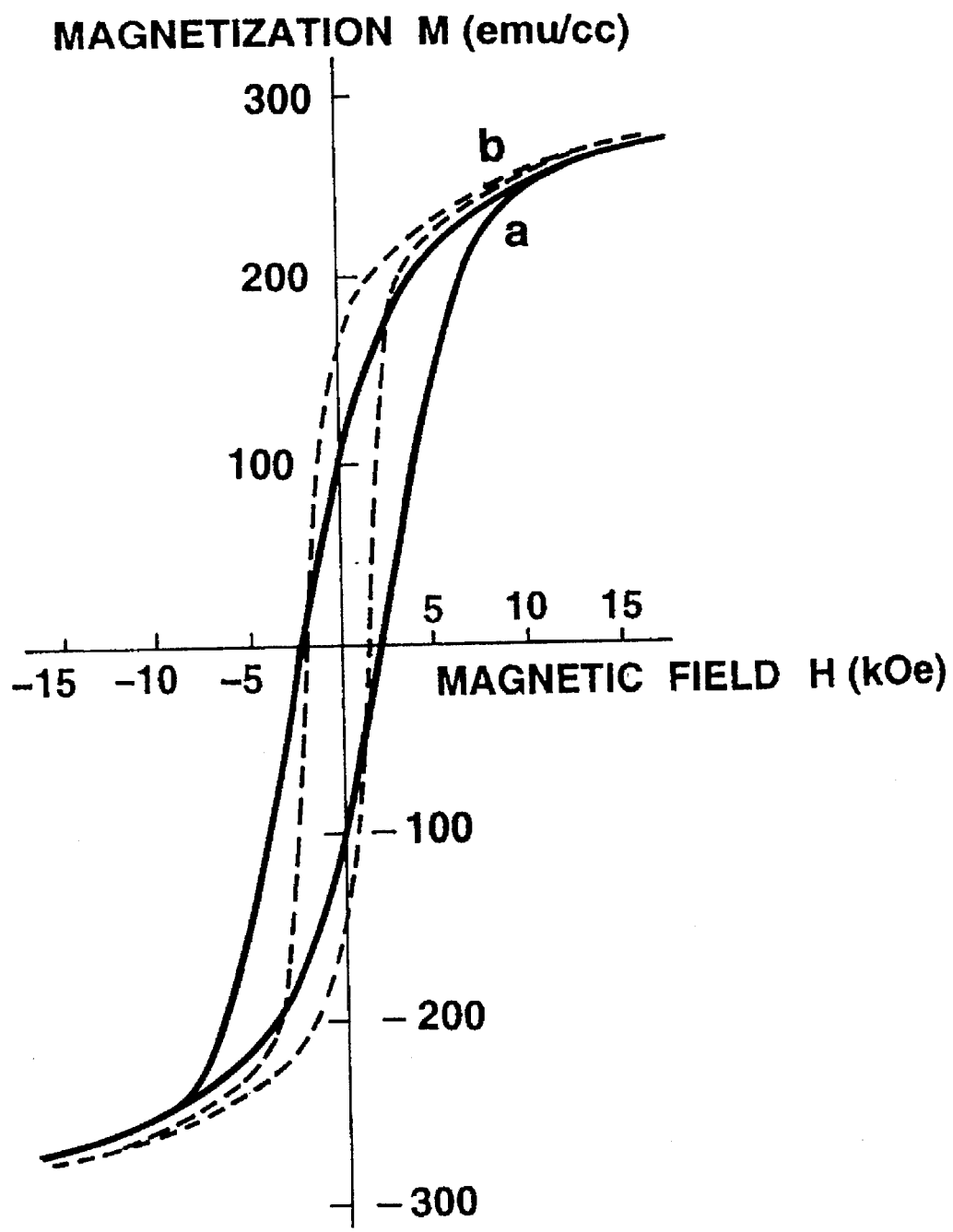
FIG. 8 shows the magnetization curves of the film obtained in Comparative Example 4.

The obtained magnetization curve of the thus-obtained spinel thin film is shown in FIG. 7. In FIG. 7, the solid line a shows the magnetization curve of the spinel thin film to which a magnetic field was applied in the perpendicular direction, and the broken line b shows the magnetization curve of the spinel thin film to which a magnetic field was applied in the in-plane direction. As shown in FIG. 7, since the residual magnetization and the coercive force of the solid line a were larger than those of the broken line b, the spinel thin film was recognized as a perpendicular magnetic film. As to the magnetic characteristics of the perpendicular magnetic film, the saturation magnetization was 280 emu/cc (3500 G), the coercive force was 2.0 kOe, and the squareness was 0.64. The spacing of the plane (400) was 2.070 Å.

Example 7

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 200° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 200 Å as a first layer.

The shutter was next rotated to form a Co- and Ni-containing oxide layer (the molar of Ni to Co is 1.5) to a thickness of 15 Å as a second layer by sputtering the Co—Ni target at a deposition rate of 30 Å/min. The first layer and the second layer constituted one unit having a thickness of 215 Å. The molar ratio of Co to Fe in one unit was 0.035. These operations were alternately repeated 18 times to obtain a multilayered film composed of 9 $Fe_3O_4$ layers each having a thickness of 200 Å, and 9 Co- and Ni-containing oxide layers each having a thickness of 15 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 380° C. for 3 hours so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Since the residual magnetization and the coercive force of the thus-obtained spinel thin film represented by the magnetization curves of the spinel thin film to which a magnetic field was applied in the perpendicular direction were larger than those represented by the magnetization curves of the spinel thin film to which a magnetic field was applied in the in-plane direction, the spinel thin film was recognized as a perpendicular magnetic film. As to the magnetic characteristics of the perpendicular magnetic film, the saturation magnetization was 280 emu/cc (3500 G), the coercive force was 108 kOe, and the squareness was 0.64. The spacing of the plane (400) was 2.078 Å.

Comparative Example 1

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 200° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 56 Å as a first layer.

The shutter was next rotated to form a Co- and Ni-containing oxide layer (the molar ratio of Ni to Co is 0.24) to a thickness of 7 Å as a second layer by sputtering the Co—Ni target at a deposition rate of 42 Å/min. The first layer and the second layer constituted one unit having a thickness of 63 Å. The molar ratio of Co to Fe in one unit was 0.15. These operations were alternately repeated 68 times to obtain a multilayered film composed of 34 $Fe_3O_4$ layers each having a thickness of 56 Å, and 34 Co- and Ni-containing oxide layers each having a thickness of 7 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 400° C. for 1 hour so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Since the residual magnetization and the coercive force of the thus-obtained spinel thin film represented by the magnetization curves of the spinel thin film to which a magnetic field was applied in the perpendicular direction were larger than those represented by the magnetization curves of the spinel thin film to which a magnetic field was applied in the in-plane direction, the spinel thin film was recognized as a perpendicular magnetic film. As to the magnetic characteristics of the perpendicular magnetic film, the saturation magnetization was 290 emu/cc (3600 G), the coercive force was 4.4 kOe, and the squareness was 0.77. The spacing of the plane (400) was 2.077 Å.

Comparative Example 2

In a high-frequency high-rate sputtering device SH-250H-T06, manufactured by Nippon Shinku Kabushiki Kaisha, a glass substrate was placed with a distance of 80 mm from an Fe target and a Co—Ni target and the substrate temperature was held at 280° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 56 Å as a first layer.

The shutter was next rotated to form a Co- and Ni-containing oxide layer (the molar ratio of Ni to Co is 0.57) to a thickness of 7 Å as a second layer by sputtering the Co—Ni target at a deposition rate of 42 Å/min. The first layer and the second layer constituted one unit having a thickness of 63 Å. The molar ratio of Co to Fe in one unit was 0.15. These operations were alternately repeated 68 times to obtain a multilayered film composed of 34 $Fe_3O_4$ layers each having a thickness of 56 Å, and 34 Co- and Ni-containing oxide layers each having a thickness of 7 Å.

The making power at the time of film formation was 300 W on the Fe side and 300 W on the Co—Ni side. In the thus-obtained multilayered film, the plane (400) was predominantly oriented in parallel with the substrate.

The obtained multilayered film was annealed in the air at a temperature of 400° C. for 1 hour so as to oxidize $Fe_3O_4$ into $\gamma$-$Fe_2O_3$ and diffuse Co and Ni, thereby producing a spinel thin film containing Fe as the main ingredient and further containing Co and Ni. As a result of the X-ray diffraction of the film obtained, the plane (400) was proved to predominantly orient in parallel with the substrate.

Since the residual magnetization and the coercive force of the thus-obtained spinel thin film represented by the magnetization curves of the spinel thin film to which a magnetic field was applied in the perpendicular direction were larger than those represented by the magnetization curves of the spinel thin film to which a magnetic field was applied in the in-plane direction, the spinel thin film was recognized as a perpendicular magnetic film. As to the magnetic characteristics of the perpendicular magnetic film, the saturation magnetization was 270 emu/cc (3400 G), the coercive force was 3.1 kOe, and the squareness was 0.70. The spacing of the plane (400) was 2.077 Å.

Comparative Example 3

A multilayered film was produced in the same way as in Example 1 except that the thickness of the spinel $Fe_3O_4$ film was 345 Å, the thickness of the Co- and Ni-containing oxide layer (the molar ratio of Co to Fe was 0.02, and the molar ratio of Ni to Co was 2.0) was 15 Å, the thickness of one unit was 360 Å, and the multilayered film was composed of 5 $Fe_3O_4$ layers each having a thickness of 345 Å, and 5 Co- and Ni-containing oxide layers each having a thickness of 15 Å.

The X-ray diffraction spectrum of the multilayered film obtained is shown in FIG. 1(*a*). As shown in FIG. 1(*a*), the planes (311) and (222) were proved to predominantly orient in parallel with the substrate.

By using the multi layered film obtained, a spinel oxide film was produced in the same way as in Example 1. As a result of the X-ray diffraction of the spinel oxide film obtained, the planes (311) and (222) were proved to predominantly orient in parallel with the substrate. From the observation of the magnetization curve of the spinel oxide film, it was found that the residual magnetization and the coercive force of the film to which a magnetic field was applied in the in-plane direction were larger than those of the film to which a magnetic field was applied in the perpendicular direction. Thus, it was proved that the film was not a perpendicular magnetic film.

Comparative Example 4

A multilayered film was produced in the same way as in Example 1 except that the thickness of the spinel $Fe_3O_4$ film was 36 Å, the thickness of the Co- and Ni-containing oxide layer (the molar ratio of Co to Fe was 0.69, and the molar ratio of Ni to Co was 1.5) was 17 Å, the thickness of one unit was 53 Å, and the multilayered film was composed of 60 $Fe_3O_4$ layers each having a thickness of 36 Å, and 60 Co- and Ni-containing oxide layers each having a thickness of 17 Å.

The X-ray diffraction spectrum of the multilayered film obtained is shown in FIG. 1(*b*). As shown in FIG. 1(*b*), the plane (400) was proved to predominantly orient in parallel with the substrate.

By using the multilayered film obtained, a spinel oxide film was produced in the same way as in Example 1. As a result of the X-ray diffraction of the spinel oxide film obtained, the plane (400) was proved to predominantly orient in parallel with the substrate. From the observation of the magnetization curve of the spinel oxide film, it was found that the residual magnetization and the coercive force of the film to which a magnetic field was applied in the in-plane direction were larger than those of the film to which a magnetic field was applied in the perpendicular direction. Thus, it was proved that the film was not a perpendicular magnetic film.

Reference Example 1

In a high-frequency high-rate sputtering device SH-250H-T06, manufactured by Nippon Shinku Kabushiki Kaisha, a glass substrate was placed with a distance of 80 mm from an Fe target and a Co target and the substrate temperature was held at 280° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ layer on the glass substrate to a thickness of 40 Å as a first layer.

The shutter was next rotated to form a CoO layer to a thickness of 7 Å as a second layer by sputtering the Co target at a deposition rate of 42 Å/min. The first layer and the second layer constituted one unit having a thickness of 47 Å. The molar ratio of Co to Fe in one unit was 0.26. These operations were alternately repeated 100 times to obtain a multilayered film composed of 50 $Fe_3O_4$ layers each having a thickness of 40 Å, and 50 CoO layers each having a thickness of 7 Å.

The making power at the time of film formation was 300 W on the Fe side and 300 W on the Co side. In the thus-obtained multilayered film, the plane (400) was predominantly oriented in parallel with the substrate.

The obtained multilayered film was annealed in the air at a temperature of 450° C. for 1 hour so as to oxidize $Fe_3O_4$ into $\gamma$-$Fe_2O_3$ and diffuse Co, thereby producing a spinel thin film containing Fe as the main ingredient and further containing Co. As a result of the X-ray diffraction of the film obtained, the plane (400) was proved to predominantly orient in parallel with the substrate.

Since the residual magnetization and the coercive force of the thus-obtained spinel thin film represented by the magnetization curves of the spinel thin film to which a magnetic field was applied in the perpendicular direction were larger than those represented by the magnetization curves of the spinel thin film to which a magnetic field was applied in the in-plane direction, the spinel thin film was recognized as a perpendicular magnetic film. As to the magnetic characteristics of the perpendicular magnetic film, the saturation magnetization was 340 emu/cc (4250 G), the coercive force was 5.4 kOe, and the squareness was 0.75. The spacing of the plane (400) was 2.082 Å.

What is claimed is:

1. A perpendicular magnetic film comprising a spinel thin film having a spinel crystal structure, consisting essentially of Fe, Co, Ni and O, and having a coercive force of less than 3000 Oe, a saturation magnetization of not less than 200 emµ/cc and a squareness of not less than 0.20, the thin film being formed on a substrate, the plane (400) of the thin film being oriented substantially parallel to said substrate so that the spacing of the plane (400) is not more than 2.082 Å, the molar ratio of Co to Fe in the thin film being 0.005 to 0.32 and the molar ratio of Ni to Co in the thin film being not less than 0.6.

2. A perpendicular magnetic film according to claim 1, wherein said film has a thickness of 500 to 5000 Å.

3. A perpendicular magnetic film according to claim 1, wherein said coercive force is 1200 to 2500 Oe.

4. A perpendicular magnetic film according to claim 1, which is produced by annealing at a temperature of 280° to 450° C. a Co- and Ni-containing multilayered film comprising a multiplicity of multilayered units formed on a substrate, each unit composed of:

(1) a magnetite $FeO_x \cdot Fe_2O_3$ ($0<x \leq 1$) layer or a magnetite $FeO_x \cdot Fe_2O_3$ ($0<x \leq 1$) layer which also contains Co, Ni or a mixture of Co and Ni diffused into the magnetite, and (2) an oxide layer comprising Co, Ni or a mixture of Co and Ni, provided that the magnetite layer (1) and the oxide layer (2) are multilayered so as to contain both Co and Ni in each of the units (1)+(2), the plane (400) of each magnetite layer (1) in the units being oriented substantially parallel to said substrate, each unit having a thickness of not more than 300 Å, the molar ratio of Co to Fe in the multilayered film being 0.005 to 0.32, and the molar ratio of Ni to Co in the multilayered film being not less than 0.6.

* * * * *